US012659905B2

(12) United States Patent
Hunukumbure et al.

(10) Patent No.: US 12,659,905 B2
(45) Date of Patent: Jun. 16, 2026

(54) METHOD AND APPARATUS FOR IMPROVEMENTS IN AND RELATING TO LOCALISATION IN MOBILE COMMUNICATION SYSTEM

(71) Applicant: Samsung Electronics Co., Ltd., Gyeonggi-do (KR)

(72) Inventors: Mythri Hunukumbure, Chertsey (GB); David Gutierrez Estevez, Chertsey (GB)

(73) Assignee: Samsung Electronics Co., Ltd (KR)

( * ) Notice: Subject to any disclaimer, the term of this patent is extended or adjusted under 35 U.S.C. 154(b) by 270 days.

(21) Appl. No.: 18/546,377

(22) PCT Filed: Feb. 11, 2022

(86) PCT No.: PCT/KR2022/002087
§ 371 (c)(1),
(2) Date: Aug. 14, 2023

(87) PCT Pub. No.: WO2022/173255
PCT Pub. Date: Aug. 18, 2022

(65) Prior Publication Data
US 2024/0129878 A1        Apr. 18, 2024

(30) Foreign Application Priority Data

Feb. 12, 2021    (GB) ...................................... 2101986
Feb. 7, 2022    (GB) ...................................... 2201510

(51) Int. Cl.
*H04W 60/04*        (2009.01)
*H04W 64/00*        (2009.01)
*H04W 84/04*        (2009.01)
(52) U.S. Cl.
CPC ........... *H04W 60/04* (2013.01); *H04W 64/00* (2013.01); *H04W 84/042* (2013.01)

(58) Field of Classification Search
CPC ....... H04W 48/16; H04W 4/90; H04W 48/04; H04W 84/04; H04W 48/12; H04W 60/04; H04W 84/12
See application file for complete search history.

(56) References Cited

U.S. PATENT DOCUMENTS

2013/0252632 A1    9/2013  Huber et al.
2020/0008007 A1    1/2020  Belghoul et al.
(Continued)

FOREIGN PATENT DOCUMENTS

EP          3669594        6/2020
WO    WO 2019/036421      2/2019
(Continued)

OTHER PUBLICATIONS

PCT/ISA/210, International Search Report dated May 23, 2022 issued in counterpart application No. PCT/KR2022/002087, 5 pages.
(Continued)

*Primary Examiner* — Iqbal Zaidi
(74) *Attorney, Agent, or Firm* — The Farrell Law Firm, P.C.

(57)        ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed is a method of performing localisation of a User Equipment, UE, in a Non-Public Network, NPN, wherein the NPN, utilises an at least partially coextensive
(Continued)

Public Land Mobile Network, PLMN, with which the UE is registered, to perform the localisation.

12 Claims, 8 Drawing Sheets

(56)                    References Cited

U.S. PATENT DOCUMENTS

| | | | |
|---|---|---|---|
| 2020/0245235 A1 | 7/2020 | Chun | |
| 2020/0259896 A1* | 8/2020 | Sachs | H04L 67/12 |
| 2020/0367022 A1 | 11/2020 | Tenny et al. | |
| 2023/0309045 A1* | 9/2023 | Youn | H04W 60/04 |
| 2024/0121572 A1* | 4/2024 | Ramachandran | H04W 4/021 |

FOREIGN PATENT DOCUMENTS

| | | |
|---|---|---|
| WO | WO 2020/091932 | 5/2020 |
| WO | WO 2020/144278 | 7/2020 |

OTHER PUBLICATIONS

PCT/ISA/237, Written Opinion dated May 23, 2022 issued in counterpart application No. PCT/KR2022/002087, 5 pages.
Search and Examination Report dated Jul. 14, 2022 issued in application No. GB 2201510.1, pp. 6.
Examination Report dated May 31, 2023 issued in application No. GB 2201510.1, pp. 3.
3GPP TS 23.273 V16.5.0 (Dec. 2020), pp. 97.
3GPP TS 23.501 V16.7.0 (Dec. 2020), pp. 446.

* cited by examiner

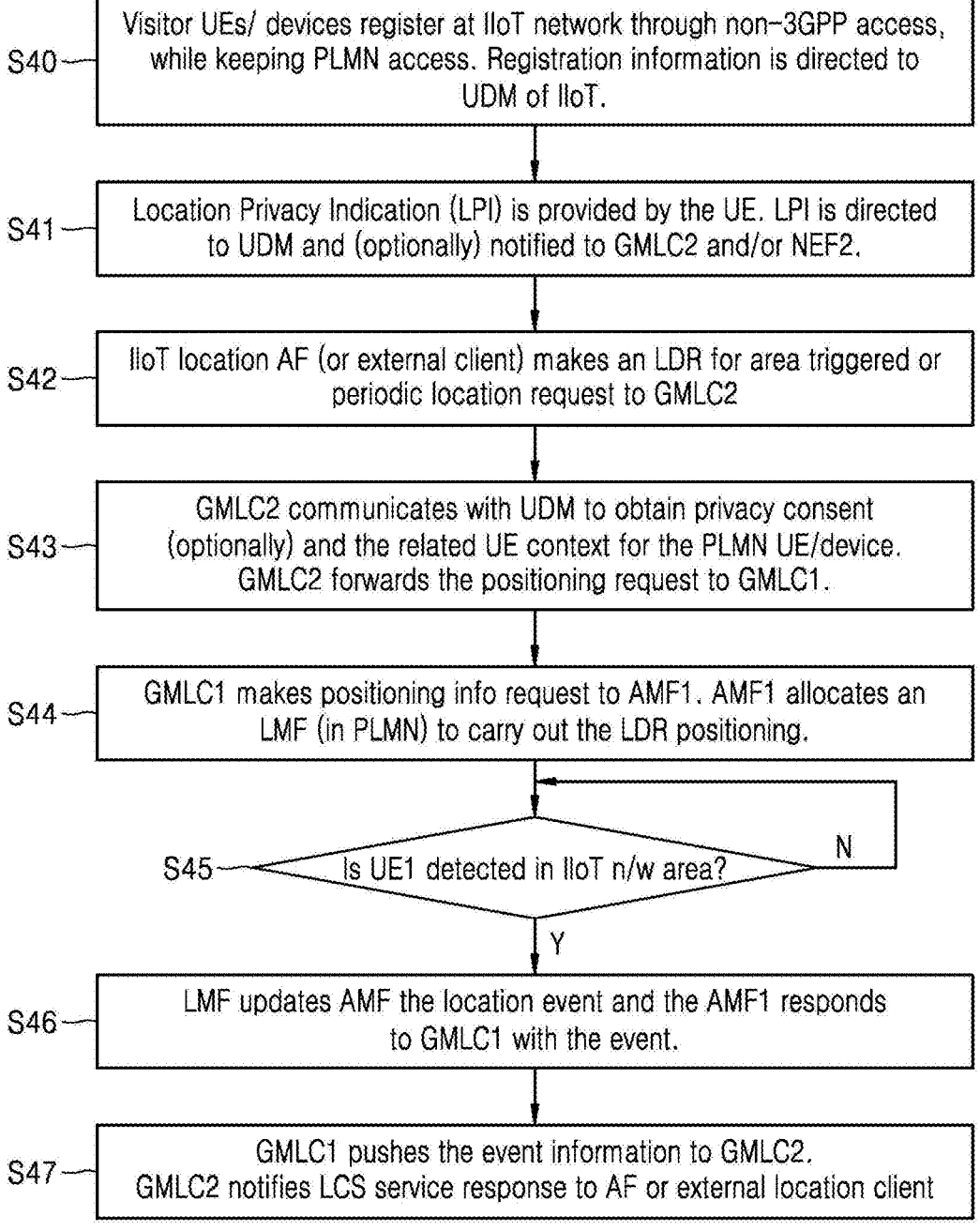

S40 — Visitor UEs/ devices register at IIoT network through non-3GPP access, while keeping PLMN access. Registration information is directed to UDM of IIoT.

S41 — Location Privacy Indication (LPI) is provided by the UE. LPI is directed to UDM and (optionally) notified to GMLC2 and/or NEF2.

S42 — IIoT location AF (or external client) makes an LDR for area triggered or periodic location request to GMLC2

S43 — GMLC2 communicates with UDM to obtain privacy consent (optionally) and the related UE context for the PLMN UE/device. GMLC2 forwards the positioning request to GMLC1.

S44 — GMLC1 makes positioning info request to AMF1. AMF1 allocates an LMF (in PLMN) to carry out the LDR positioning.

S45 — Is UE1 detected in IIoT n/w area?    N

Y

S46 — LMF updates AMF the location event and the AMF1 responds to GMLC1 with the event.

S47 — GMLC1 pushes the event information to GMLC2. GMLC2 notifies LCS service response to AF or external location client

FIG.5

METHOD AND APPARATUS FOR IMPROVEMENTS IN AND RELATING TO LOCALISATION IN MOBILE COMMUNICATION SYSTEM

PRIORITY

This application is a National Phase Entry of PCT International Application No. PCT/KR2022/002087, which was filed on Feb. 11, 2022, and claims priority to United Kingdom Patent Application Nos. 2101986.4 and 2201510.1, which were filed on Feb. 12, 2021, and Feb. 7, 2022, respectively, the entire content of each of which is incorporated herein by reference.

TECHNICAL FIELD

The present invention relates to localisation of a device in a telecommunication network. Localisation is a process by which a network, which may be serving a particular device is able to determine to a suitable degree of accuracy where the device is within the coverage area of the network. Embodiments of the invention relate, in particular, to issues arising when a mobile device or User Equipment, UE, enters the coverage area of a non-public (or private) network, since this poses issues with the localisation process.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Solution to Problem

Provided are method and apparatus for improvements in and relating to localization in mobile communication system. Disclosed is a method of performing localisation of a User Equipment, UE, in a Non-Public Network, NPN, wherein the NPN, utilises an at least partially coextensive Public Land Mobile Network, PLMN, with which the UE is registered, to perform the localisation.

BRIEF DESCRIPTION OF DRAWINGS

For a better understanding of the invention, and to show how embodiments of the same may be carried into effect, reference will now be made, by way of example only, to the accompanying diagrammatic drawings in which:

FIG. 5 shows a flow chart for the execution of LDR localisation according to an embodiment of the invention.

BEST MODE FOR CARRYING OUT THE INVENTION

Figure 1:
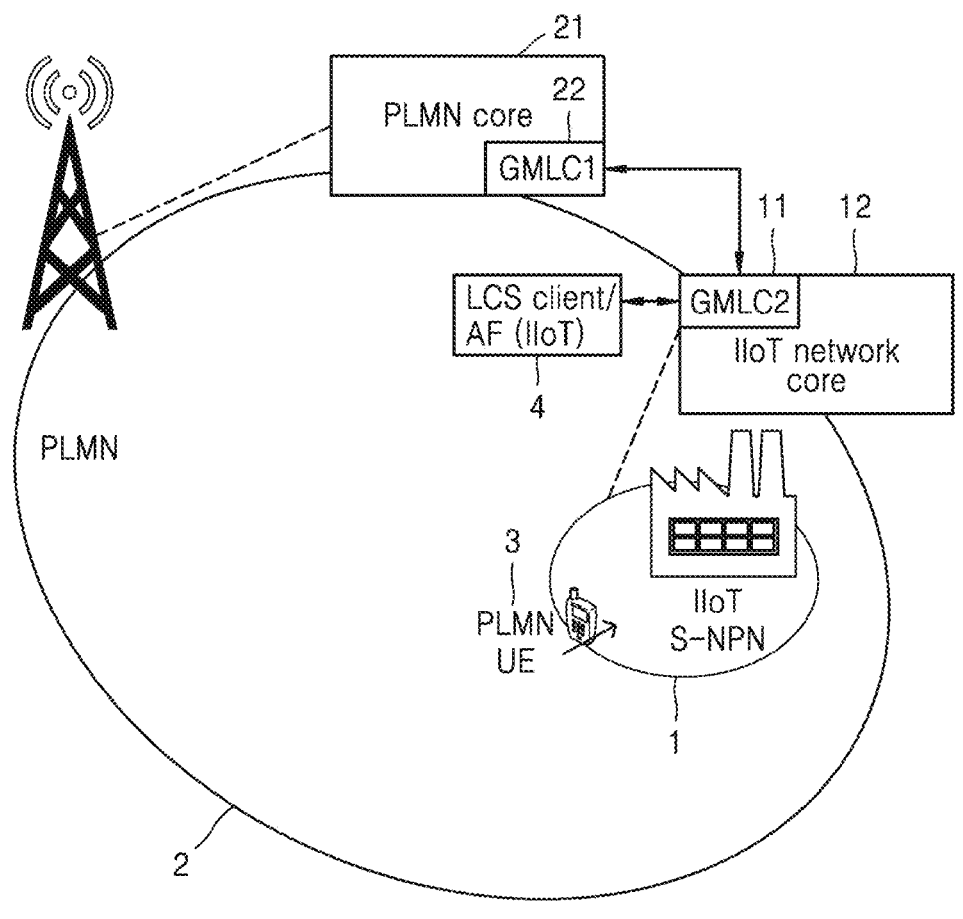
FIG. 1 shows a representation of a NPN situated within the coverage area of a PLMN according to an embodiment of the invention.

Embodiments of the present invention aim to address shortcomings in the prior and to provide a means by which a UE entering a NPN may be localised as required.

According to the present invention there is provided an apparatus and method as set forth in the appended claims. Other features of the invention will be apparent from the dependent claims, and the description which follows.

According to a first aspect of the present invention, there is provided a method of performing localisation of a User Equipment, UE, in a Non-Public Network, NPN, wherein the NPN, utilises an at least partially coextensive Public Land Mobile Network, PLMN, with which the UE is registered, to perform the localisation.

In an embodiment, the UE is not registered or able to register with the NPN.

In an embodiment, the NPN determines that localisation via the PLMN is more efficient in terms of energy and/or resource considerations.

In an embodiment, a Gateway Mobile Location Centre, GMLC, of the NPN initiates the localisation by means of a request towards a GMLC of the PLMN.

In an embodiment, if the GMLC of the PLMN approves the request, the PLMN performs the localisation.

In an embodiment, the NPN is an Industrial Internet of Things network.

In an embodiment, the UE registers with the NPN via non-3GPP access while retaining PLMN access.

In an embodiment, Location Privacy Indication, LPI, is provided by the UE and directed to a Unified Data Management, UDM, function of the NPN.

In an embodiment, an Application Function, AF, of the NPN or an external client makes a Location Deferred Request, LDR, to a Gateway Mobile Location Centre, GMLC, of the NPN for either an area-triggered or periodic location request.

In an embodiment, the GMLC of the NPN obtains privacy consent from the UDM together with related UE context information and forwards this to a GMLC of the PLMN.

In an embodiment, the GMLC of the PLMN makes a positioning request to an Access and Mobility Management Function, AMF, of the PLMN and the AMF allocates a Location Management Function, LMF, to carry out the LDR positioning.

In an embodiment, the NPN determines if the UE is present in a coverage area of the NPN and if it is so determined the LMF of the PLMN updates the AMF of the PLMN with the location information which is then sent to the GMLC of the PLMN.

In an embodiment, the GMLC of the PLMN passes the location information to the GMLC of the NPN which then notifies the Application Function, AF, of the NPN or the external client with the location information.

In an embodiment, the NPN is situated entirely within a coverage area of the PLMN.

According to a second aspect pf the present invention, there is provided an Apparatus arranged to perform the method of the first aspect Embodiments of the invention provide a solution whereby an NPN can request the services of the public PLMN network (which is at least partially coextensive with the private IIoT network) to effectively acquire the location information of such external entities. This cooperation between the private and public networks is an importance feature of the present invention.

Embodiments relate to IIoT network based solutions but may be applicable in many other scenarios where a private network with a CSG has to localise external entities that enter the private network premises.

Embodiments of the invention provide call flows and service messages to support IIoT based positioning in a 3GPP architecture. A distinction is made, in general, between public PLMN wide area cellular networks and private small cell networks (which are suited to IIoT). Furthermore, improvements in relation to UE registration are provided.

Embodiments of the invention provide solutions in relation to the issue of localizing external UEs and Devices within a private network area, which are shadowed from the closed subscriber group (CSG) of the private network. These UEs can belong to visitors, contractors coming to the site or embedded devices in lorries, trucks, forklifts, all of which typically have public PLMN connectivity. By enabling the GMLC of the private IIoT network to identify the correct GMLC (of a public PLMN) for the said UE or device to communicate this localisation request, these shadowed UEs/IoT devices can be effectively localized. This helps to ensure health and safety rules are followed and also protects the asset security within the private IIoT network premises.

Embodiments of the invention provide details of architectural updates (in terms of registration in a new network and service message modifications in the call flow) to enable a private IIoT network to localize shadowed UEs/Devices that do not fall within its CSG, but are still accessing the premises. Embodiments are provided for registering and obtaining localisation privacy indication (LPI) from these devices through standardized procedures and using the public PLMN network to carry out the actual localisation. Prior art LDR (Location Deferred Request) procedures are modified so that the consent through privacy settings of such UEs/devices is obtained only once. Also, the 'Nudm_SDM_Get' and 'Nudm_UECM_Get' service messages between the GMLC and Unified Data Management (UDM) are updated to reflect that the GMLC of the private IIoT network can request the services from the correct serving GMLC of the respective shadowed UE or IoT device.

Although a few preferred embodiments of the present invention have been shown and described, it will be appreciated by those skilled in the art that various changes and modifications might be made without departing from the scope of the invention, as defined in the appended claims.

MODE FOR THE INVENTION

Private or non-public networks (NPN) are often established in industrial Internet of Things, IIoT, settings, covering factories, warehouses, depots and other industrial areas. These private networks operate tightly controlled closed subscriber groups, CSG, for safeguarding the security of sensitive data. However, there will sometimes be external visitors, contractors and sensor devices fitted to external vehicles, like lorries and forklifts, regularly entering such IIoT network premises. These will be outside the CSG and cannot be localised using the private network. Yet, to ensure health and safety and security of the factory assets, the localisation of these external people/devices will often be vital.

The problem associated with such scenarios are not properly addressed in the prior art. In terms of providing localisation services from a second network to a UE registered with a first network, only a roaming solution—with Visitor Gateway Mobile Location Centre (V-GMLC) and Home Gateway Mobile Location Centre (H-GMLC)—is currently supported and is not generally found useful.

Industry IoT (IIoT) networks are increasingly utilised as highly secure, private or Non-public Networks (NPN) with closed subscriber groups (CSG) which allow only authorized UEs and IoT devices to access their services. These IIoT networks have strict requirements on the accuracy and latency in positioning UEs and IoT devices. However, there will be UEs and IoT devices which enter such IIoT premises, but will be out of the CSG. These UEs can belong to visitors, contractors or support staff and the IoT devices can be embedded in lorries, trucks, forklifts which frequent the IIoT premises. Due to health and safety and security reasons, these UEs and IoT devices generally need to be accurately located within the IIoT private network premises, although they are 'shadowed' from the IIoT network i.e. they are not permitted to directly connect to the NPN.

Typically, the IIoT network area is embedded within a wider 5G PLMN coverage and the IIoT network has some WiFi coverage. Such WiFi connections can be used to register the UEs, with their consent, to be localized within the IIoT network premises and the PLMN can carry out the actual Radio Access Network, RAN, positioning steps.

FIG. 1 shows a representation of the coverage area 1 of an IIoT network which sits within the coverage area 2 of a larger PLMN. The PLMN network has a network core 21, in which is located GMLC1 22. The IIoT network has its own core 11, in which is located GMLC2 12. A UE 3, registered with the PLMN, enters the coverage area 1 of the IIoT.

Embodiments of the invention provide a framework for the private IIoT network being deployed as a Stand-alone Non-Pubic Network (S-NPN), within the wider coverage area of the public PLMN. The private S-NPN and public PLMN have their separate access and core network components and can communicate only through standard network interfaces (typically through a firewall). Section 5.30.2.7 of TS 23.501 specifies how a S-NPN can request services from a PLMN using a standard interface. Interactions between the IIoT network and the wider PLMN will occur accordingly.

The IIoT network has an external client or an internal network function to handle localisation for all the UEs and Devices within the premises of this Industry network. Use is made of the MT-LR (Mobile Terminated Location Request) procedure for periodic, event triggered and UE available localisation call flow specified in FIG. 6.3.1-1 of TS 23.273 as a basis for embodiments of the invention.

Embodiments of the invention provide adaptation of the non-3GPP based registration procedures and modifications in initial service message flow to enable the GMLC2 11 of IIoT network to identify the correct PLMN for localisation of respective UEs/devices, 3, shadowed from the IIoT network 1. After this registration and PLMN identification, GMLC2 11 can communicate with this PLMN's GMLC1 21 and can use the standardized call flows (as in TS 23.273) to execute the localisation service requests.

In order to execute the localisation of the PLMN UEs/devices 3 by service requests from Locations Services (LCS) client/Application Function (AF) 4 attached to the IIoT network 1, these UEs/devices 3 should be registered in the IIoT network. Additionally, as specified in TS 23.273, any UE subjected to a commercial localisation request should have given explicit privacy consent for this. The UE privacy consent needs to be registered in the User Data Repository (UDR) and accessed by the Unified Data Management (UDM) of the IIoT network 1 and for this the UE/device 3 registration in the IIoT 1 network is essential. This is so that unscrupulous parties are not able to perform localisation on a device which has not given its explicit consent for this to happen.

Embodiments of the invention use a non-3GPP access technology, such as WiFi, to register the UE/device 3 in the IIoT network 1. As this is provided in the secure IIoT network, the UE/device 3 can treat this as a trusted non-3GPP access mode, but embodiments also work with un-trusted non-3GPP access. As per section 4.2.2.2.2 Registration procedures in TS 23.502, the UE 3 can initiate a registration procedure under the following conditions, which match relate well to the scenario herein described: "when the UE needs to update its capabilities or protocol parameters that are negotiated in Registration procedure with or without changing to a new Tracking Area (TA)".

The UE/device 3 can be prompted to register with the IIoT network 1 without changing to a new tracking area, as it would continue to be served by the PLMN 2. In addition to enabling UE/device localisation, this registration can provide some other services to the UE 3 through WiFi access, such as notifying the safety procedures and emergency exit routes.

Along with this UE/device registration process, the privacy consent for localisation can be obtained from the user. This can be done by filling an on-line form from the device, with trusted WiFi connectivity, for example. This procedure is set out in more detail below.

The UE registration process via non-3GPP access, while maintaining the connectivity to the home PLMN, is new and provides some advantages as set out below. This can be best described by reference to an existing registration architecture in TS 23.501.

Figure 2:
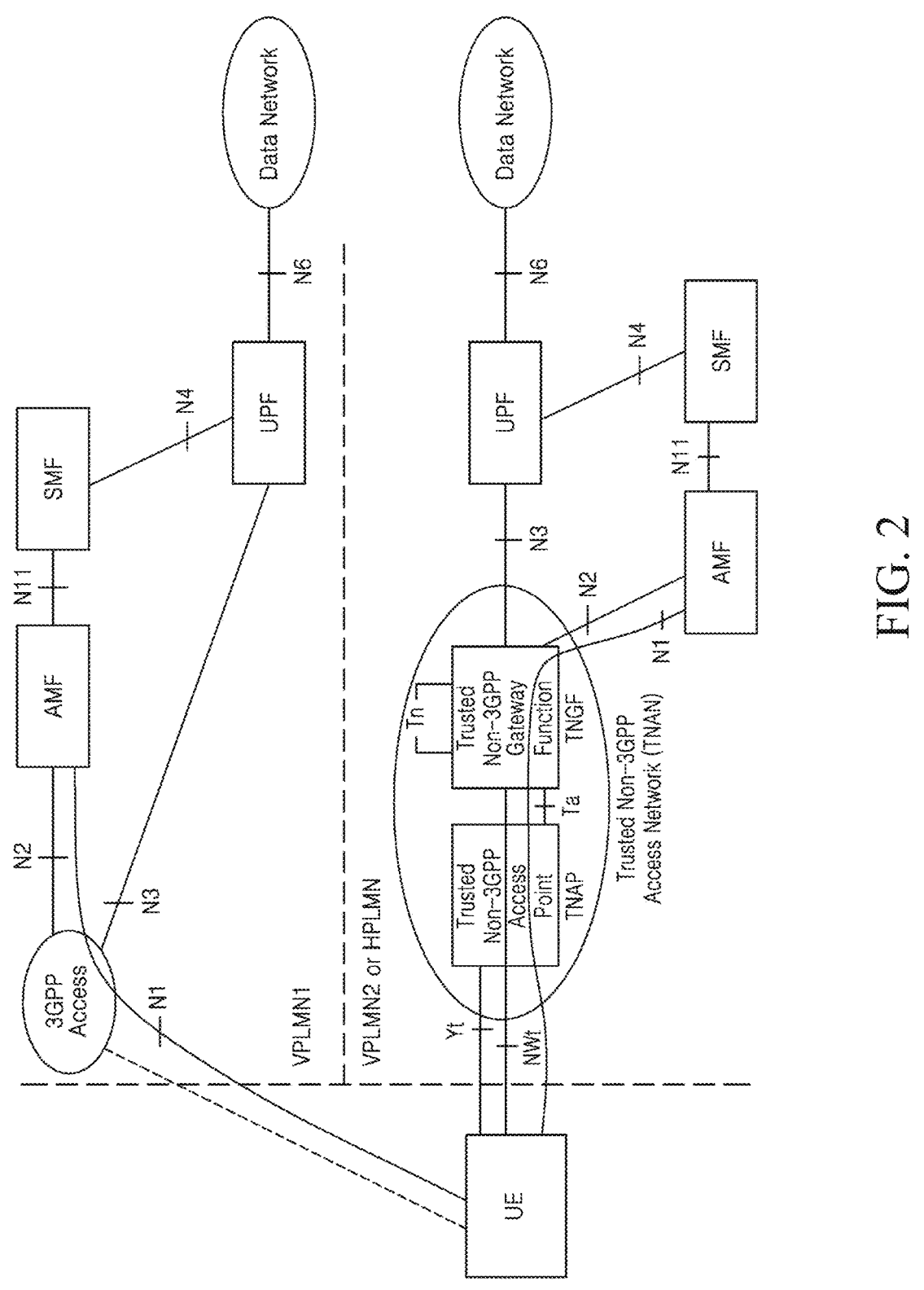
FIG. 2 shows a representation of standardised architecture option for trusted non-3GPP access registration in roaming according to an embodiment of the invention.

The registration process as of TS 23.501, FIG. 4.2.8.2.2-4, reproduced here as FIG. 2, depicts the LBO roaming architecture with trusted non-3GPP access using a different PLMN than the 3GPP access. Embodiments of the invention provide that this architecture is modified to accommodate the non-roaming scenario set out. Here the UE or device 3 is connected to the home PLMN and registered with the different NPN (the IIoT network) using trusted non-3GPP access. This registration process can be carried out with untrusted non-3GPP access as well.

FIG. 2 shows the UE 3 and various components in the H-PLMN and the V-PLMN.

Embodiments of the invention modify the configuration shown in FIG. 2 such that the VPLMN1 (as labelled in FIG. 2) becomes the home PLMN or PLMN1, which is the PLMN the UE or device is connected to. The VPLMN2 or HPLMN (as labelled in FIG. 2) is the NPN (IIoT network), which is shadowed from the UE or device because it is a CSG. The trusted non-3GPP access (eg: WiFi) is the access means to register these UEs/devices with this IIoT network and it also gives the UEs connection to the Access and Mobility Management Function, AMF, of the IIoT network. Thus (as in the TS 23.501 architecture solution) the UE/device is concurrently connected to two AMFs from the two networks. Because the IIoT network is a secure closed network, the WiFi (or other radio access), can be categorized as trusted non-3GPP access. A similar solution is provided with un-trusted non-3GPP access, where a relevant diagram is provided in FIG. 4.2.8.2.2-2 of TS 23.501 (not shown herein).

In this case, registration via non-3GPP access in the IIoT network, embodiments provide that the UE/device includes its SUPI (Subscriber Permanent Identifier). With this information, the UDM of IIoT network can work out that the UE is subscribed to a certain PLMN.

A compulsory feature for any commercial localisation service is that explicit UE privacy consent should be obtained to execute that service. In the present scenario, the UDM2 of the IIoT network shall have recorded this privacy consent (or Location Privacy Indication, LPI, as this is termed in TS 23.273) before the service request is initiated by the LCS client 4 or the AF/NF of the IIoT network.

Figure 3:
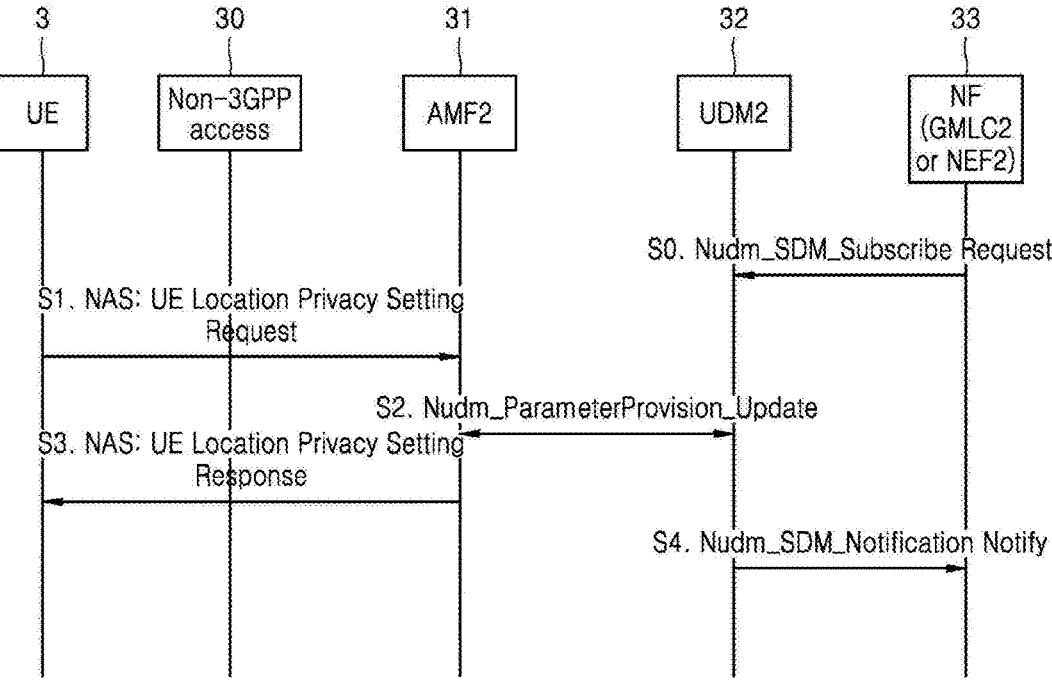
FIG. 3 shows a UE-initiated privacy setting procedure according to an embodiment of the invention.
Figure 6:
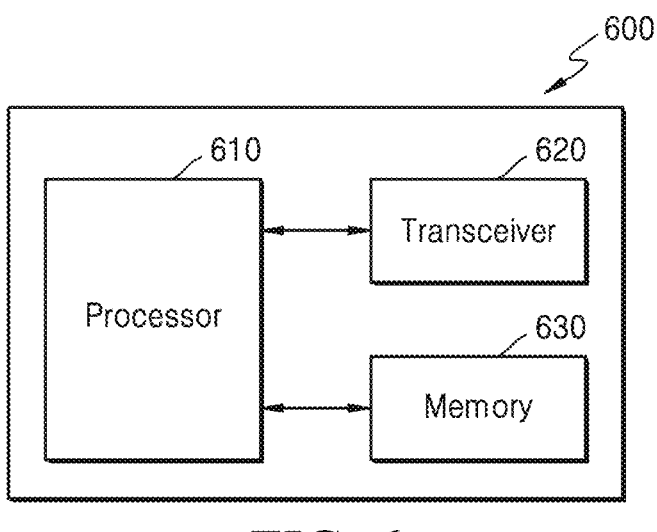
FIG. 6 is a diagram illustrating a terminal 600 according to another embodiment of the present disclosure.

This LPI can be obtained at the time of the UE registration, via the trusted non-3GPP access. The registration process for the UE can contain a mandatory clause for the UE (user) to give consent for its location to be obtained within the IIoT network premises by this network. The UE giving consent to this clause can initiate a UE Location Privacy Setting procedure as indicated by FIG. 6.12.1-1 of TS 23.273. The AMF2 co-ordinates this procedure. However the radio access will happen through the trusted non-3GPP access (as for the registration process) and hence the above referenced figure will be updated as shown in FIG. 3. Again, this process can also happen through un-trusted non 3GPP access.

The procedure can start with the IIoT Network Function subscribing to receive updates from the UDM on user privacy indication updates. This NF can be:

(a) GMLC2 11, the gateway Mobile Location Centre of the IIoT network. In this case, the GMLC2 will be updated with the privacy consent within this privacy setting procedure. Step S12 of the Location Deferred Request, LDR, procedure in FIGS. 4A and 4B (see later for details) will not be needed in this case.

Figure 4A:
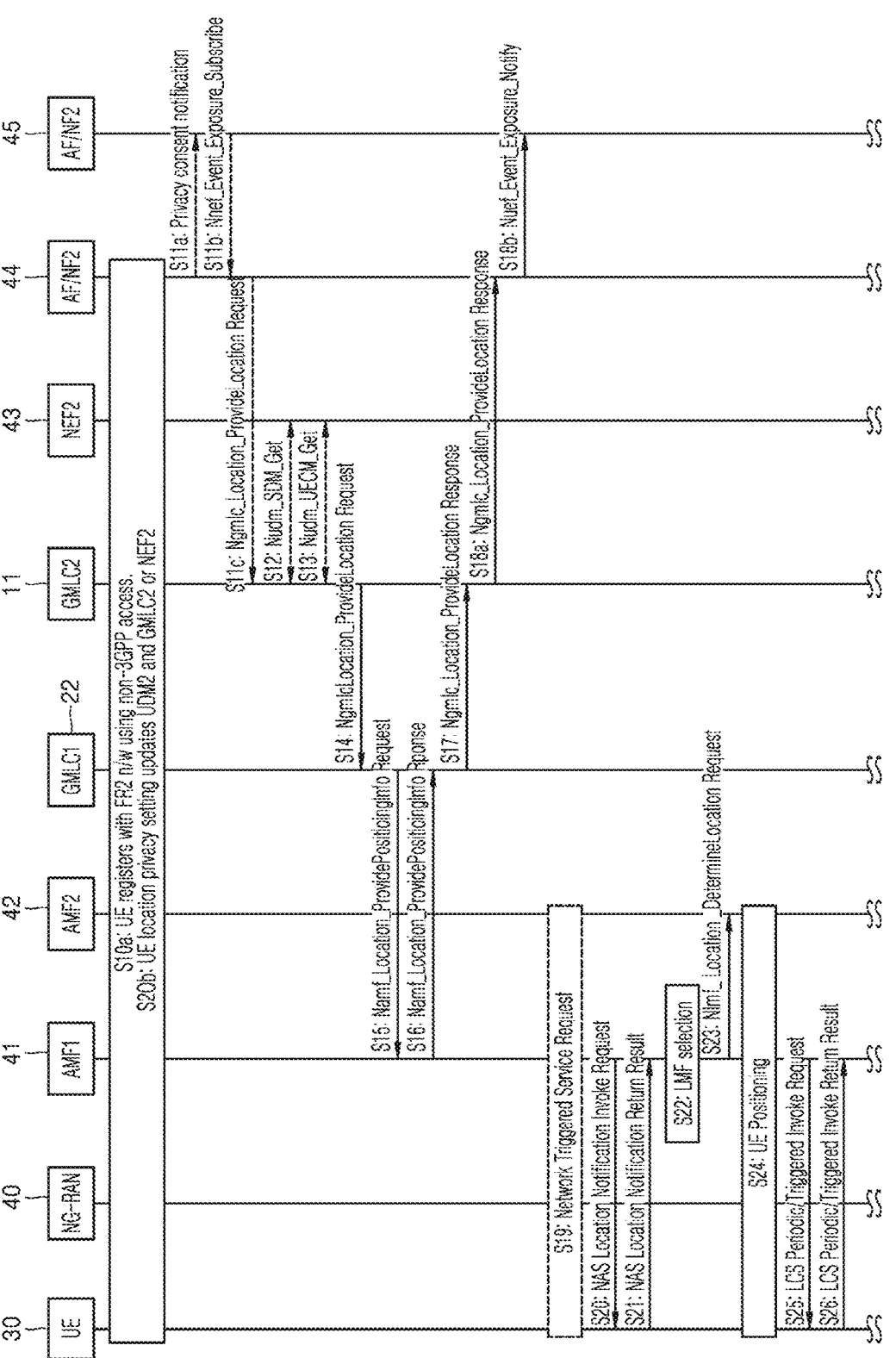
FIGS. 4A and 4B shows a call flow, according to an embodiment of the invention, for the area triggered MT-LR for localising a PLMN UE within an IIoT network.
Figure 4B:
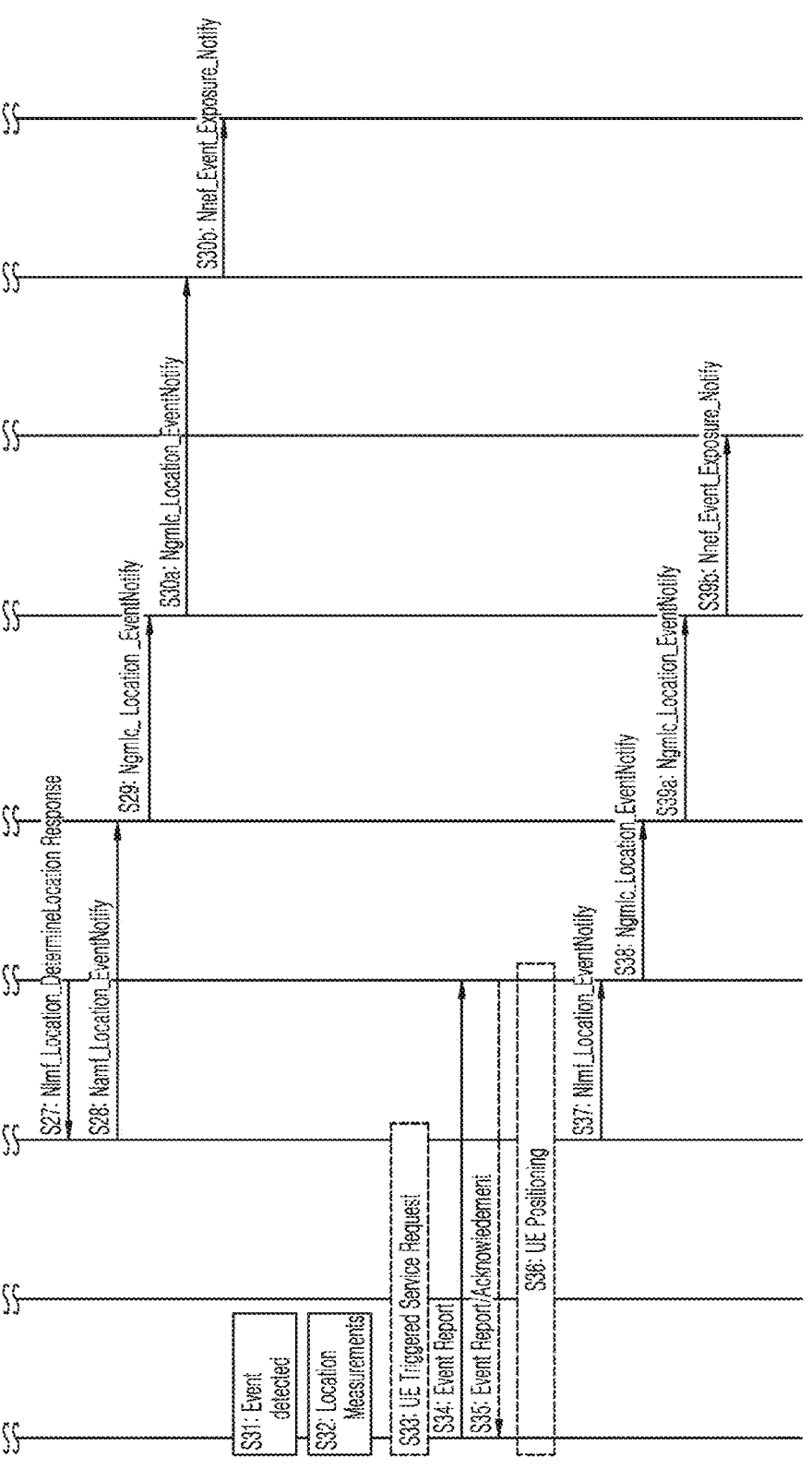

(b) NEF2, the network exposure function of IIoT network. The NEF2 can then in turn update the external LCS client or the application function in-charge of handling localisation processes in the IIoT network. The full set of steps of the LDR procedure in FIGS. 4A and 4B is applicable in this case.

For the present scenario, the trusted non-3GPP access interworking procedure provides the access to the IIoT network AMF (or AMF2), and this enables steps S1, S2 and S3 of the call flow in FIG. 3 to be executed. The AMF will update the UDM about the LPI for this UE. If a Network Function (eg: GMLC) is subscribed to receive updates from the UDM, this NF will be notified of this LPI update of the UE, and the NF can optionally take steps to unsubscribe from further updates from this UE in a case where the LDR localisation request is cancelled, for example.

The actual UE/device localisation in this scenario is triggered by the area event of the UE/device 3 entering the IIoT network 1 premises. It can happen in the first instance (after the UE/device registration and privacy consent) and at any subsequent point when the UE/device re-visits the IIoT site. In the current specifications of TS 23.273, section 5.4.6, the privacy consent from the UE for the LDR service should be obtained both at the point of initiating the LDR request and at the point of making the actual localisation. The relevant excerpt states:

"5.4.6 LCS Service Authorization for a Deferred UE Location

Support of UE LCS privacy for a deferred UE location is the same as that described in clause 5.4.5 for an immediate UE location with the differences and qualifications described in this clause.

An (H)GMLC or NEF shall subscribe to notification of a change in the UE LCS privacy profile from the UDM at the start of a deferred 5GC-MT-LR procedure and shall verify UE privacy both at the start of the deferred 5GC-MT-LR procedure and for each location result returned to an LCS client or AF based on the most recent UE LCS privacy profile received from the UDM."

In the case of localisation within IIoT networks, embodiments of the invention provide that this second privacy verification before each of the location results is omitted. Many of the localisation applications in IIoT need results with low latency. A second privacy verification can be time consuming and also the user can deny the permission at a second verification point. While a second verification is justifiable if the user is in a public area or his own private space, the IIoT network may need to localise UEs at all times due to health and safety reasons. Also since these industry premises are secure areas and visitors are agreeing to entry conditions at registration, this can include a clause to say 'agree to localisation now and at any future occasion when present within the industry premises' or similar. This privacy consent can be recorded in the UDR and accessed via UDM when the LDR location request is made. Thus a modification for TS 23.273, section 5.4.6, shown above may read:

"In case of a deferred location request is made by a network function or an external client connected to an Industry IoT network, a single privacy verification at the start of the deferred 5GC-MT-LR procedure is sufficient to execute the localisation at any time in future, when the localisation conditions are met."

The call flow for a localisation procedure according to an embodiment of the invention follows similar steps to an area-triggered (deferred) MT-LR service. The call flow shown in FIG. 6.3.1-1 of TS 23.273 is used as a baseline. In this modified call flow (shown in FIGS. 4A and 4B below), the same (or similar) network entities are used and the message sequence is similar to that shown in FIG. 6.3.1-1 of TS 23.273. The main differences in terms of the functionality of the entities are that the H-GMLC in FIG. 6.3.1-1 is termed as GMLC2 11, referring to the IIoT network 1. The V-GMLC in FIG. 6.3.1-1 is termed as GMLC1 22, this has PLMN UE connectivity throughout and can be requested by GMLC2 11 to carry out the localisation procedure on behalf of GMLC2 11. It is assumed that the service agreements between the PLMN 2 and IIoT 1 networks are in place, in order to conduct such localisation services.

It is also assumes that the UE registration and localisation privacy indication (LPI) procedures have been conducted as discussed above. These steps in the call flow are shown as steps S10a and S10b, as some of the options executed in these steps have a bearing on the call flow. Presented is the option of an application function (AF) 45 handling localisation related processes in the IIoT network. This AF 45 communicates with the GMLC2 11 through the network exposure function (NEF2) 44. Equally, an external LCS client can handle localisation processes and this client can directly communicate with GMLC2. This option is not shown in FIGS. 4A and 4B, but the skilled person will readily understand how this may be implemented.

As noted above, the pre-requisites for the execution of the call flow of FIGS. 4A and 4B is that the UE 3 is registered (step S10a) in the IIoT network (through non-3GPP access) while keeping the PLMN registration and the LPI is obtained from the UE (step S10b). This LPI can be notified to the GMLC2 11 and/or NEF2 44. In any case the LPI information is kept in the UDM2 43. Another option is to store the LPI (with UE registration information) in the UDR (not shown) and this can be retrieved by the UDM2 43 when a service request is made.

In a first option, the UE subscription and the LPI can be notified to the AF 45 by the NEF2 44 in step S11a. Then an event exposure subscription request from the AF 45 to the NEF2 44 can be made, with regards to deferred localisation of a given subscriber in step S11b. The NEF2 44 then forwards this as a location request to the GMLC2 11 of the IIoT network in step S11c. Step S12 and subsequent steps are then followed in the call flow for this option.

In a second option, the GMLC2 11 can obtain the LPI information from UDM2 43 in the UE initiated privacy setting procedure (as shown in FIG. 3) and the steps S11*a*, S11*b* and S11*c* can be skipped. The GMLC2 11 can also skip step S12 in this call flow and move onto step S13. If, however, the GMLC2 11 does not have this LPI, it would move onto step S12 to obtain the LPI from the UDM2 43. Thus, step S12 is an optional step. The remaining steps are followed in the same manner as in the first option.

An embodiment of the invention makes changes to the configuration of this service message, as indicated below.

a) 'Nudm_SDM_Get' message: an embodiment makes changes compared to the original message.

The GMLC2 11 forwards this message to the UDM2 43, with the SUPI of the UE/Device 3 and the LDR type localisation request indicator as input parameters. The UDM2 43 will have an entry for this UE/Device 3 (within this scenario context) as an external party to the CSG and the LPI. The UDM2 43 will return (as outputs) the LPI for this UE 3 (default message). As new additions to the outputs, the UDM2 43 may include that privacy consent is only needed once for this particular service and all the UE access types (WiFi, PLMN, . . . ) that the UE is capable of. This service output message can also include that the UE is not in the CSG.

With the LPI information available within GMLC2 11 (through LPI notification in FIG. 3) or provided through the optional step S12, the GMLC2 11 can now move onto acquire the context information for this UE 3. This is done in step S13 service message. The changes to this original message are detailed below:

b) 'Nudm_UECM_Get' message: an embodiment makes changes compared to the original message.

Once the GMLC2 11 has the privacy consent for localisation from the UDM2 43 and new outputs from the UDM2 43 in the above Nudm_SDM_Get message (set out above), the GMLC2 11 can work out that the localisation has to be handled by an external access network. Based on the Quality of Service (QoS) level needed, the GMLC2 11 can decide that PLMN access based localisation will be needed. The UE 3 is also capable of WiFi access in the IIoT network 1, but GMLC2 11 can compare the QoS levels of localisation and can decide to go for the PLMN option. The GMLC2 11 will input the UE ID, NF Type, Access Type (as PLMN) in this 'Nudm_UECM_Get' message. These messages are already defined in TS23.502.

However, this embodiment treats IIoT and PLMN as two separate access types and indicates PLMN receiving inputs from IIoT network (or S-NPN). The PLMN and IIoT access types can be mutually exclusive for some UEs and devices in 5G-NR. With this input, the UDM2 43 will recognize that the PLMN network 2 has to be used for this localisation service and will return the related context information for this UE 3. This will include returning the GMLC address (or more accurately the GMLC1 of PLMN) in the output message. There are similar indications in TS 23.273, section 6.1.2, for the roaming scenario, where the UDM returns the VGMLC address for the roaming UE. With the UE's SUPI, the UDM2 43 can determine the correct PLMN and can provide the correct GMLC address related to this PLMN. All the UEs/devices entering the IIoT network premises can have different PLMNs as their subscribed networks. By GMLC2 11 requesting PLMN access type and with the SUPI, the UDM2 43 can determine the correct PLMN.

With this information, the GMLC2 11 can forward the "ProvideLocation_request" to the correct GMLC1 22. The remainder of the call flow (as in FIG. 2) does not need to change from TS 23.273. The GMLC1 22 will execute this LDR with the help of PLMN network's AMF 41 and Location Management Function, LMF, 42, acquire the localisation event results and notify the GMLC2 11. GMLC2 11 will, in turn, notify the NEF2 44 and onwards to AF 45 of the localisation event. The AF 45 can select if it needs a one-off notification, or needs periodic updates of the UE location, in its original service request. The resulting notifications at the end of the call flow will match the request type.

FIG. 5 shows a flow chart including the steps included in a localisation process according to an embodiment of the invention.

At S40 a visitor UE 3 registers at the IIoT or NPN using non-3GPP (e.g. WiFi access, while keeping PLMN access. This registration information is directed to the UDM2 32 of the NPN.

At S41 LPI is provided by the UE, possibly with explicit intervention by the user. The LPI is directed to the UDM2 32 and optionally notified to the GMLC2 11 of the NPN and/or the NEF2 44.

At S42, the IIoT AF (or external client) 4 makes an LDR for area-triggered or periodic location request to GMLC2 11 of the NPN.

At S43, GMLC2 11 communicates with UDM2 32 to optionally obtain privacy consent and the related UE context for the PLMN/UE device 3. GMLC2 11 forwards the positioning request to GMLC1 22.

At S44, GMLC1 22 makes a positioning request to AMF1 41 of the PLMN network. AMF1 41 allocates an LMF 42 in the PLMN to carry out the LRD request.

At S45, the NPN checks to see if the UE 3 is detected within its coverage area. This check is repeated until such time as the UE 3 is detected.

At S46, once detected, the LMF 42 updates the AMF1 41 with the location event notification and the AMF1 41 responds to GMLC1 22 with the event notification.

At S47, GMLC1 22 pushes the event information to GMLC2 11 which then notifies the LCS service response to the IIoT AF (or external client) 4 which made the request in the first place.

By means of an embodiment of the invention, a UE within the coverage area of a NPN can be localised by means of a PLMN which operates in the proximity of (or overlaps with) the NPN.

FIG. 6 is a diagram illustrating a terminal 600 according to another embodiment of the present disclosure.

Referring to the FIG. 6, the terminal 600 may include a processor 610, a transceiver 620 and a memory 630. However, all of the illustrated components are not essential. The terminal 600 may be implemented by more or less components than those illustrated in FIG. 6. In addition, the processor 610 and the transceiver 620 and the memory 630 may be implemented as a single chip according to another embodiment.

The aforementioned components will now be described in detail.

The processor 610 may include one or more processors or other processing devices that control the proposed function, process, and/or method. Operation of the terminal 600 may be implemented by the processor 610.

The processor 610 may perform operations of UE aforementioned based on FIG. 1 to FIG. 5.

The transceiver 620 may include a RF transmitter for up-converting and amplifying a transmitted signal, and a RF receiver for down-converting a frequency of a received signal. However, according to another embodiment, the transceiver 620 may be implemented by more or less components than those illustrated in components.

The transceiver 620 may be connected to the processor 610 and transmit and/or receive a signal. The signal may include control information and data. In addition, the transceiver 620 may receive the signal through a wireless channel and output the signal to the processor 610. The transceiver 620 may transmit a signal output from the processor 610 through the wireless channel.

The memory 630 may store the control information or the data included in a signal obtained by the terminal 600. The memory 630 may be connected to the processor 610 and store at least one instruction or a protocol or a parameter for the proposed function, process, and/or method. The memory 630 may include read-only memory (ROM) and/or random access memory (RAM) and/or hard disk and/or CD-ROM and/or DVD and/or other storage devices.

Figure 7:
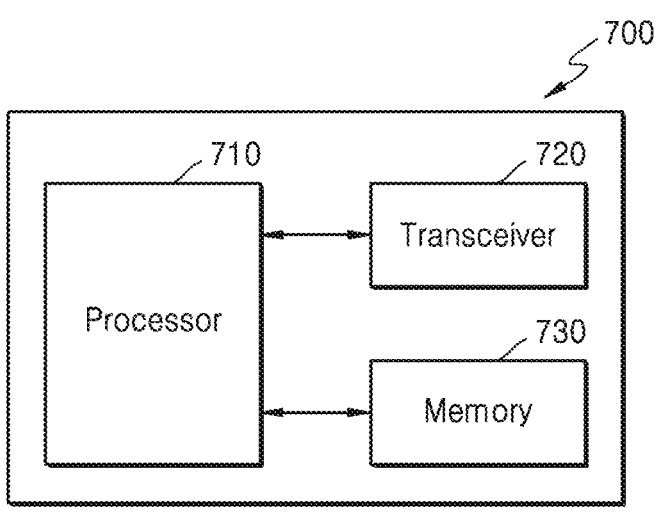
FIG. 7 is a diagram illustrating a network entity 700 according to another embodiment of the present disclosure.

FIG. 7 is a diagram illustrating a network entity 700 according to another embodiment of the present disclosure.

The network entity may include one of AMF, UDM, GMLC, NEF, NF and AF.

Referring to the FIG. 7, the network entity 700 may include a processor 710, a transceiver 720 and a memory 730. However, all of the illustrated components are not essential. The terminal 700 may be implemented by more or less components than those illustrated in FIG. 7. In addition, the processor 710 and the transceiver 720 and the memory 730 may be implemented as a single chip according to another embodiment.

The aforementioned components will now be described in detail.

The processor 710 may include one or more processors or other processing devices that control the proposed function, process, and/or method. Operation of the network entity 700 may be implemented by the processor 710.

The processor 710 may perform operations of one of AMF, UDM, GMLC, NEF, NF and AF aforementioned based on FIG. 1 to FIG. 5.

The transceiver 720 may be connected to the processor 710 and transmit and/or receive a signal. The signal may include control information and data. In addition, the transceiver 720 may receive the signal through a wireless channel and output the signal to the processor 710. The transceiver 720 may transmit a signal output from the processor 710 through the wireless channel.

The memory 730 may store the control information or the data included in a signal obtained by the network entity 700. The memory 730 may be connected to the processor 710 and store at least one instruction or a protocol or a parameter for the proposed function, process, and/or method. The memory 1030 may include read-only memory (ROM) and/or random access memory (RAM) and/or hard disk and/or CDROM and/or DVD and/or other storage devices.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a User Equipment (UE) in a wireless communication system, the method comprising:
   registering with a Non-Public Network (NPN), via non-3GPP access, while retaining access to a Public Land Mobile Network (PLMN), wherein the NPN utilizes the PLMN to perform localisation of the UE; and
   transmitting a Location Privacy Indication (LPI) to a Unified Data Management (UDM) function of the NPN, wherein the LPI is associated with a Location Deferred Request (LDR) for an area-triggered or periodic location request by an Application Function (AF) of the NPN or an external client to a Gateway Mobile Location Centre (GMLC) of the NPN.

2. The method of claim 1, wherein the UE is not registered or able to register with the NPN.

3. The method of claim 1, wherein the NPN determines that localisation via the PLMN is more efficient in terms of at least one of energy or resource considerations.

4. The method of claim 1, wherein the GMLC of the NPN initiates the localisation by transmitting a request towards a GMLC of the PLMN.

5. The method of claim 4, wherein in response to the GMLC of the PLMN approving the request, the PLMN performs the localisation.

6. The method of claim 1, wherein the NPN is an Industrial Internet of Things network.

7. The method of claim 1, wherein the GMLC of the NPN obtains privacy consent from the UDM together with related UE context information and forwards this to a GMLC of the PLMN.

8. The method of claim 7, wherein the GMLC of the PLMN makes a positioning request to an Access and Mobility Management Function (AMF) of the PLMN and the AMF allocates a Location Management Function (LMF) to carry out LDR positioning.

9. The method of claim 8, wherein the NPN determines if the UE is present in a coverage area of the NPN, and if it is so determined, the LMF of the PLMN updates the AMF of the PLMN with location information which is then sent to the GMLC of the PLMN.

10. The method of claim 9, wherein the GMLC of the PLMN passes the location information to the GMLC of the NPN which then notifies the AF of the NPN or the external client with the location information.

11. The method of claim 1, wherein the NPN is situated entirely within a coverage area of the PLMN.

12. A User Equipment (UE), in a wireless communication system, the UE comprising:

a transceiver; and at least one processor coupled with the transceiver and configured to:

register with a Non-Public Network (NPN), via non-3GPP access, while retaining access to a Public Land Mobile Network (PLMN), wherein the NPN utilizes the PLMN to perform localisation of the UE, and transmit a Location Privacy Indication (LPI) to a Unified Data Management (UDM) function of the NPN, wherein the LPI is associated with a Location Deferred Request (LDR) for an area-triggered or periodic location request by an Application Function (AF) of the NPN or an external client to a Gateway Mobile Location Centre (GMLC) of the NPN.

* * * * *